United States Patent Office 3,657,247
Patented Apr. 18, 1972

3,657,247
PESTICIDAL HALOGEN-SUBSTITUTED
PYRIMIDINYL PHOSPHORUS ESTERS
Peter Frank Hilary Freeman, Earley, Roger Franklin Joseph Markey, Woodley, Frederick Charles Peacock, Ascot, and Stuart Peter Sharpe, Maidenhead, England, assignors to Imperial Chemical Industries Limited, London, England
No Drawing. Filed July 7, 1969, Ser. No. 839,686
Claims priority, application Great Britain, Aug. 7, 1968, 37,720/68
Int. Cl. C07d 51/36
U.S. Cl. 260—256.5 R                         4 Claims

ABSTRACT OF THE DISCLOSURE

Halogen-substituted pyrimidinyl phosphorus esters which are useful as pesticides.

---

This invention relates to new, pesticidal, pyrimidine derivatives, to processes for making them, to compositions containing them and to methods for combating pests. The invention provides a pyrimidine derivative according to the general formula:

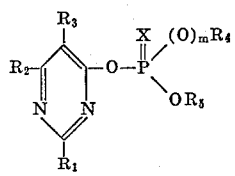

and salts thereof, wherein $R_1$ is a hydrocarbyl or mercapto-hydrocarbyl radical or a substituted or unsubstituted amino group; $R_2$ and $R_3$ are atoms of hydrogen or of a halogen or are hydrocarbon radicals and at least one of $R_2$ and $R_3$ is an atom of a halogen; $R_4$ and $R_5$ are hydrocarbyl radicals; X is an atom of oxygen or sulphur and $m$ is nought or one. More particularly the invention provides a pyrimidine derivative according to the general formula:

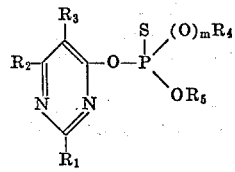

and salts thereof, wherein $R_1$ is an alkyl, alkylthio, alkoxycarbonylalkylthio, amino, formamido, acylamino, mono- or di-alkylamino radical; $R_2$ and $R_3$ are atoms of chlorine or bromine or are alkyl radicals and at least one of $R_2$ and $R_3$ is an atom of chlorine or bromine; $R_4$ and $R_5$ are alkyl radicals and $m$ is nought or one.

Especially useful compounds according to the invention are pyridimidine derivatives as defined above and wherein each ring substituent containing carbon atoms comprises from one to ten carbon atoms and preferably from 1 to 4 carbon atoms.

In a further aspect the invention provides a pyridimidine phosphate according to the general formula:

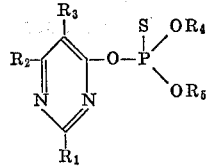

and salts thereof, wherein $R_1$ is an alkyl, alkylthio, amino or mono- or di-alkylamino radical containing from 1 to 10 carbon atoms; $R_2$ and $R_3$ are atoms of chlorine or bromine or are alkyl radicals containing from 1 to 10 carbon atoms, at least one of $R_2$ and $R_3$ being a chlorine or bromine atom; and $R_4$ and $R_5$ are alkyl radicals containing from 1 to 10 carbon atoms.

Particularly useful pyrimidine derivatives are those bearing a halogen atom at the 5-position of the pyrimidine ring, that is compounds having the above structural formula wherein $R_3$ is an atom of a halogen.

As examples of suitable salts there may be mentioned both organic and inorganic salts, for example hydrochlorides, hydrogen sulphates, acetates, oxalates, formates, citrates and para-toluene sulphonates.

The invention particularly includes the specific pyrimidine derivatives set out in Table 1 below.

TABLE 1

| Compound number | Structural formula | Physical constant |
|---|---|---|
| 1 | ![compound 1] Cl—pyrimidine—O—P(=S)(OC₂H₅)₂, N(CH₃)₂ | $n_D^{14}$ 1.5355. |
| 2 | Cl, CH₃—pyrimidine—O—P(=S)(OCH₃)₂, N(C₂H₅)₂ | Viscous oil. |
| 3 | Cl, CH₃—pyrimidine—O—P(=S)(OC₂H₅)₂, N(C₂H₅)₂ | $n_D^{25}$ 1.5267. |
| 4 | Br, CH₃—pyrimidine—O—P(=O)(OC₂H₅)₂, N(CH₃)₂ | $n_D^{24}$ 1.5162. |
| 5 | Cl, CH₃—pyrimidine—O—P(=S)(OC₂H₅)₂, N(CH₃)₂ | $n_D^{25}$ 1.5333. |
| 6 | Cl—pyrimidine—O—P(=S)(OC₂H₅)(OC₂H₅), NH₂ | M.P. 104° C. |
| 7 | Br, CH₃—pyrimidine—O—P(=S)(OC₂H₅)(OC₂H₅), SCH₃ | Low melting solid. |

TABLE 1—Continued

| Compound number | Structural formula | Physical constant |
|---|---|---|
| 8 | Cl, CH₃, N, N, SC₂H₅ pyrimidine with —O—P(=S)(OC₂H₅)(OC₂H₅) | $n_D^{19}$ 1.540 |
| 9 | Cl, CH₃, N, N, SCH₃ pyrimidine with —O—P(=S)(OC₂H₅)(OC₂H₅) | $n_D^{26}$ 1.5260. |
| 10 | Cl, CH₃, N, N, S·CH₂·COOC₂H₅ pyrimidine with —O—P(=S)(OC₂H₅)(OC₂H₅) | $n_D^{23}$ 1.5342. |
| 11 | Cl—pyrimidine—NH·CHO with —O—P(=S)(OC₂H₅)(OC₂H₅) | M.P. 78–79° C. |
| 12 | Cl—pyrimidine—NH₂ with Cl and —O—P(=S)(OC₂H₅)(OC₂H₅) | M.P. 113–114° C. |
| 13 | Cl—pyrimidine—CH₃ with —O—P(=S)(OC₂H₅)(OC₂H₅) | $n_D^{26}$ 1.5120. |
| 14 | Cl—pyrimidine—N(CH₃)₂ with —O—P(=O)(OC₂H₅)(OC₂H₅) | M.P. 40° C. |
| 15 | Cl—pyrimidine—N(CH₃)₂ with —O—P(=S)(OC₂H₅)(OC₂H₅) | $n_D^{21}$ 1.5358. |
| 16 | Cl, CH₃, pyrimidine—N(C₂H₅)(C₂H₅) with —O—P(=S)(C₂H₅)(OCH₃) | $n_D^{23}$ 1.5483. |
| 17 | Cl, CH₃, pyrimidine—N(C₂H₅)(C₂H₅) with —O—P(=S)(C₂H₅)(OC₂H₅) | $n_D^{21}$ 1.5468. |

In a further aspect, therefore, the invention provides each of the compounds specifically enumerated in Table 1 above.

In this specification the numbering of the pyrimidine ring is as follows:

It may be noted that the 4- and 6-positions are quivalent.

The compounds of this invention can be obtained by a number of different methods and in so far as these methods are used to prepare them they are considered as constituting further aspects of the invention.

Thus one method of preparing the invention compounds comprises bringing into reaction a 4- or 5-halo-2-amino-6-hydroxypyrimidine with a di-hydrocarbylhalothio phosphate or -phosphonate. The reaction is conveniently carried out in the presence of a condensing base, for example an alkali metal salt such as potassium carbonate, sodium hydride, or sodium ethoxide and preferably in the presence of a solvent, for example ethyl acetate, dimethylformamide, toluene and benzene.

After the reaction is complete the desired invention compound may conveniently be recovered from the mixture by pouring it into water particularly when sodium hydride is used as the base and dimethyl formamide as the solvent and extracting the compound by dissolution in an inert organic solvent or removing it by filtration.

The compounds of the present invention are very toxic toward a variety of insect pests including mosquito larvae (*Aedes aegypti*), black aphids (*Aphis fabae*), green aphids (*Megoura viciae*), red spider mites (*Tetranychus telarius*), grain weevils (*Calandra granaria*), diamond back moth caterpillars (*Plutella maculipennis*), mustard beetles (*Phaedon cochleariae*), common houseflies (*Musca domestict*) and root knot nematodes (*Melodigyne incognita*).

The compounds of the invention also possess antifungal properties and in particular, may be used to combat the following specific diseases: wheat rust (*Puccinia recondita*), rice blast (*Piricularia oryzae*), apple powdery mildew (*Podosphaera leucotricha*), vine downy mildew (*Plasmopara viticola*), cucumber powdery mildew (*Sphaerotheca fuliginea*), wheat and barley powdery mildews (*Erysiphe graminis*) and apple scab (*Venturia inaequalis*).

A particularly useful feature of the activity of the invention compounds is the ability of some of them to act individually as systemic pesticides, that is to say, their ability for example, to move in a plant to combat a fungal infection or insect infestation thereon remote from a site of initial application of a compound. Thus a compound of the invention, or a composition containing the same, may be applied to the soil surrounding the roots of a plant and taken up by the plant through its roots to combat pests on the plant.

The invention, accordingly, further consists in pesticidal compositions comprising as an active ingredient a compound as hereinbefore defined.

In use the invention compounds, and compositions containing them, may be applied in a variety of ways. Thus their application can be directly onto pests themselves or to a pest hibitat. In so far as plants are concerned the whole plant, or parts thereof affected by a pest, may be treated. Alternatively, the application of the compounds (and compositions) may be to the locus of the plant; for example the soil used to grow the plant may be treated.

Alternatively, or in addition, seeds of plants may be treated, and for this purpose the soil in which the seeds are to be sown, or in which they are germinating, can be treated.

In a furthur aspect, therefore, the invention provides a process of combating pests which comprises applying to a habitat of, or directly to, the pests, or to the locus of a plant, or seeds thereof, or to plants or seeds themselves a compound or a composition as hereinbefore defined.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, koalin, bentonite, kieselguhr, dolomite, calcium carbonate, talc, powdered magnesia, fuller's earth, gypsum. Hewitt's earth, diatomaceous earth and china clay. Compositions for dressing seed, for example, may comprise an agent assisting the adhesion of the composition to the seed, for example, a mineral oil.

The compositions may also be in the form of dispersible powders or grains comprising, in addition to the active ingredient, a wetting agent to facilitate the dispersion of the powders or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic or non-ionic type. Suitable agents of the cationic type include, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for examples sodium dodecylbenzenesulphonate, sodium, calcium or ammonium lignosulphonate, butylnaphthalene sulphonate, and a mixture of the sodium salts of diisopropyl- and triisopropyl- naphthalene sulponic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, and condensation products of the said partial esters with ethylene oxide, and the lecithins.

Suitable suspending agents are, for example, hydrophilic colloids, for example polyvinylpyrrolidone and sodium carboxymethylcellulose, and the vegetable gums, for example gum acacia and gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichlorethylene.

The compounds of the invention may also be formulated in the form of capsules or microcapsules containing either the active compound itself, or a composition containing the active ingredient, and prepared by any of the known encapsulation or microencapsulation techniques.

The compositions to be used as sprays may also be in the form of aerosols wherein the formulation is held in a container under pressure in the presence of a popellant such as fluoro-trichloromethane or lichlorodifluoromethane.

By the inclusion of suitable additives, for example, for improving the distribution, adhesive power and resistance to rain on treated surfaces, the different compositions can be better adapted for the various uses for which they are intended.

The compounds may also be conveniently formulated by admixing them with fertilizers. A prefered composition of this type comprises granules of fertilizer material incorporating, for example coated with, a compound of the invention. The fertilizer material may, for example, comprise nitrogen or phosphate-containing substances.

In yet a further aspect of the invention, therefore, we provide a fertilizer comprising a compound as hereinbefore defined.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients, and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 1.0% by weight of active ingredient or ingredients may be used.

It is to be understood that the compositions of this invention may comprise, in addition to an invention compound, one or more other compounds having biological activity.

The invention is illustrated, but not limited, by the following examples.

EXAMPLE 1

This example illustrates the preparation of O,O-diethyl (4 - chloro - 2 - dimethylamino-6-pyrimidinyl) thiophosphate of structural formula:

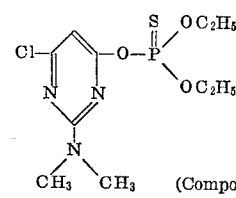

(Compound No. 1 of Table 1)

3.5 gm. (0.02 mole) of 4-chloro - 2 - dimethylamino-6-hydroxypyrimidine and 4.2 gm. (0.03 mole) anhydrous potassium carbonate are suspended in 100 ml. dry ethyl acetate and 3.8 gm. (0.02 mole) diethyl chlorothiophosphate added slowly. The mixture is then refluxed overnight, cooled and evaporated to dryness. The residue is then dissolved in toluene, washed with 5% aqueous sodium hydroxide solution and then with water until the washings are neutral to litmus paper. On drying and evaporating the solution, an oil is obtained which is heated under high vacuum for 30 minutes to remove volatile materials.

EXAMPLE 2

This example illustrates the preparation of the compound having the structural formula:

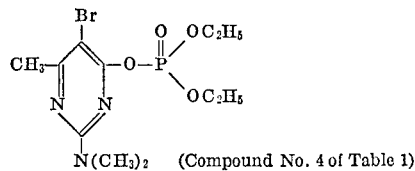

(Compound No. 4 of Table 1)

Sodium (0.46 g. 0.02 mol.) was dissolved in ethanol (15 ml.) followed by 5-bromo-2-dimethylamino-6-hydroxy-4-methyl pyrimidine (4.6 g. 0.02 mol.). After stirring for a few minutes the ethanol was striped off and the sodium salt of the pyrimidine was suspended in dry toluene (15 ml.) and diethyl chlorophosphate added. The mixture was heated under reflux for 4 hours. The reaction mixture was then washed with dilute alkali, then with water and finally dried over anhydrous sodium sulphate. The toluene was evaporated and the oil obtained was heated on a steam bath under high vacuum (0.1 mm.) for a quarter of an hour to yield the product.

EXAMPLE 3

This example illustrates the preparation of the compound, O,O-diethyl(4-chloro-2-methylpyrimid-6-yl) thiophosphate, having the structural formula:

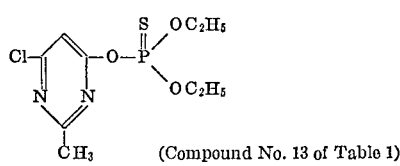

(Compound No. 13 of Table 1)

4-chloro-2-methyl-6-hydroxypyrimidine (1.8 g. 0.0125 mole) and potassium carbonate (2.8 g. 0.02 mole) were suspended in ethyl acetate (50 ml.) dried by magnesium sulphate and the mixture was stirred for 15 minutes. The chlorothiophosphate (2.35 g. 0.0125 mole) was then added dropwise and the mixture stirred at refluxing temperatures for 22 hours. It was then allowed to cool and evaporated to dryness. The semi-solid residue was dissolved in toluene, washed firstly with 10% aqueous sodium hydroxide four times using 10 ml. aliquots and then with water until the washings were neutral to litmus. The washed residue was then dried over magnesium sulphate, and the toluene removed in vacuo to yield a pale yellow oil, yield 2.3 g., which was heated for 1 hour at 50° C. and 0.5 mm. pressure to remove volatile matter. Yield 1.9 g. $n_D^{26}$ 1.5120.

EXAMPLE 4

This example illustrates the preparation of O,O-diethyl (5 - chloro - 4-methyl-2-ethylthiopyrimid-6-yl) thiophosphate, having the structural formula:

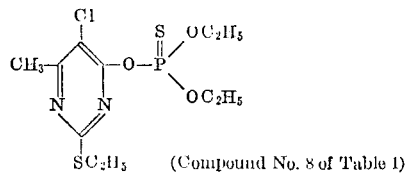

(Compound No. 8 of Table 1)

This compound was prepared by a similar procedure to that recited in the preceding example using the following reactants.

5-chloro-2-ethylthio-6-hydroxy-4-methylpyrimidine (2.6 g. 0.015 mole).
Potassium carbonate (3.4 g. 0.025 mole).
Diethyl chlorothiophosphate (2.8 g. 0.015 mole).
Ethyl acetate (MgSO$_4$ dried) (60 ml.).
Yield 1.1 g. $n_D^{19}$ 1.5405.

EXAMPLE 5

Using the appropriate starting substances and appropriate methods of preparation similar to those described in Examples 1 to 4 above the compound numbered 2, 3, 5, 6, 7, 9, 10, 11, 12, 14, 15, 16 and 17 in Table 1 above were prepared.

EXAMPLE 6

This example illustrates a concentrate comprising a miscible oil which is readily convertible by dilution with water into a liquid preparation suitable for spraying purposes. The concentrate has the following composition:

|  | Percent weight |
|---|---|
| Compound No. 1 of Table 1 | 25.0 |
| "Lubrol" L (alkylphenol/ethylene oxide condensate; "Lubrol" is a trademark) | 2.5 |
| Calcium dodecylbenzenesulphonate | 2.5 |
| "Aromasol" H (alkylbenzene solvent; "Aromasol" is a trademark) | 70.0 |
|  | 100.0 |

EXAMPLE 7

This example also illustrates a concentrate which is in the form of a miscible oil. The composition of this concentrate is as follows:

|  | Percent wt. |
|---|---|
| Compound No. 5 of Table 1 | 25.0 |
| "Lubrol" L ("Lubrol" is a trademark) | 4.0 |
| Calicum dodecylbenzenesulphonate | 6.0 |
| "Aromasol" H ("Aromasol" is a trademark) | 65.0 |
|  | 100.0 |

EXAMPLE 8

This example illustrates a wettable powder having the following composition:

|  | Percent wt. |
|---|---|
| Compound No. 6 of Table 1 | 25.0 |
| Sodium silicate | 5.0 |
| Calcium lignosulphonate | 5.0 |
| China clay | 65.0 |
|  | 100.0 |

EXAMPLE 9

This example illustrates an atomisable fluid comprising a mixture consisting of 25% by weight of the compound No. 8 of Table 1 and 75% by weight of xylene.

EXAMPLE 10

This example illustrates a dusting powder which may be applied directly to plants or other surfaces and comprises 1% by weight of the compound No. 5 of Table 1 and 99% by weight of talc.

EXAMPLE 11

25 parts by weight of the product described in Example 1, 65 parts by weight of xylene, and 10 parts of an alkyl aryl polyether alcohol ("Triton" X–100; "Triton" is a trademark) were mixed in a suitable mixer.

EXAMPLE 12

The ingredients listed below were ground together in the proportions stated to produce a powdered mixture readily dispersible in liquids.

| | Percent wt. |
|---|---|
| Compound No. 7 of Table 1 | 50 |
| Dispersol T | 5 |
| China clay | 45 |
| | 100 |

EXAMPLE 13

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, siz 44–100 to obtain the desired size of grains.

| | Percent wt. |
|---|---|
| Compound No. 5 of Table 1 | 50 |
| Dispersol T | 12.5 |
| Goulac | 5 |
| Calcium dodecylbenzenesulphonate | 12.5 |
| Sodium acetate | 20 |
| | 100.0 |

EXAMPLE 14

A composition suitable for use as a seed dressing was prepared by mixing all three of the ingredients set out below in the proportions stated.

| | Percent wt. |
|---|---|
| Compound No. 4 of Table 1 | 80 |
| Mineral oil | 2 |
| China clay | 18 |
| | 100 |

EXAMPLE 15

A granular composition was prepared by dissolving the active ingredient in a solvent, spraying the solution obtained onto the granules of pumice and allowing the solvent to evaporate.

| | Percent wt. |
|---|---|
| Compound No. 2 of Table 1 | 5 |
| Pumice granules | 95 |
| | 100 |

EXAMPLE 16

A formulation was prepared by mixing and grinding the ingredients recited below in the proportions stated.

| | Percent wt. |
|---|---|
| Compound No. 3 of Table 1 | 40 |
| Goulac | 10 |
| Water | 50 |
| | 100 |

The toxicity of a number of the compounds of this invention toward a variety of insect pests was investigated and the tests conducted and results obtained are set out below. The compounds of the invention were in each case used in the form of a liquid preparation containing 0.1% by weight of the compound. The preparations were made by dissolving each of the compounds in a mixture of solvents consisting of 2 parts by volume of acetone and 2 parts by volume of ethyl alcohol.

The solutions were then diluted with water containing 0.01% by weight of a wetting agent sold under the trade name of "Lissapol" NX until the liquid preparations contained the required concentration of the compound ("Lissapol" is a trademark).

The test procedure adopted with regard to each test insect was basically the same and comprised supporting a number of insects on some medium which may be a host plant or some foodstuff on which the insect feeds, and treating either or both the insects and the medium with the preparations. The mortality of the insects was then assessed at periods varying from one to three days after the treatment.

The results of the tests are given below in Table II. In this table the first column indicates the compound used. Each of the subsequent columns indicates the name of the test insects, the host plant or medium on which it was supported and the number of days which were allowed to elapse after treatment before assessing the percentage of insects which had been killed. The assessment is expressed in integers which range from 0 to 3.

0 represents less than 30% kill
1 represents from 30–49% kill
2 represents from 50–90% kill
3 represents over 90% kill The concentration of the invention compound in the solutions used was 1,000 parts per million for all the pests except *Aedes aegypti* which was 10 parts per million.

TABLE II

| Compound No. Table I | Calandra granaira<br>Grain weevil<br>Wheat seeds<br>3 days | Pieris brassicae<br>White cabbage butterfly larvae<br>Cabbage leaf<br>24 hours | Aedes aegkpti<br>Mosquito larva<br>Water | Aphis fabae<br>Black aphid<br>Broad bean<br>2 days | Megoura viciae<br>Green aphid<br>Broad bean<br>2 days | Tetrankchus telarius<br>Red spider mite<br>French bean<br>3 days | Tetrankchus telarius<br>Red spider egg<br>French bean<br>3 days | Plutella maculipennis<br>Diamond back moth<br>Mustard plant | Phaedon cochleariea<br>Mustard beetle<br>Mustard/paper<br>2 days | Musca domestica<br>Housefly<br>Milk and sugar cotton wool<br>1 day | Meloidogyne incognita<br>Root knot nematode<br>Tomato<br>14–18 days In vitro |
|---|---|---|---|---|---|---|---|---|---|---|---|
| 1 | 0 | 3 | 3 | 3 | 3 | 3 | 3 | 3 | 3 | 3 | 3 |
| 2 | 3 | 2 | 3 | 3 | 3 | 3 | 0 | 3 | 3 | 3 | — |
| 3 | 0 | 3 | 3 | 3 | 3 | 3 | 3 | 2 | 3 | 3 | 1 |
| 4 | 0 | — | 3 | 3 | — | 3 | 2 | 1 | 3 | 3 | — |
| 5 | 0 | 0 | 3 | 3 | 3 | 3 | 2 | 3 | 3 | 3 | 1 |
| 6 | 3 | 3 | 3 | 3 | 3 | 3 | 3 | 3 | 3 | 3 | — |
| 7 | 3 | 0 | 3 | 3 | 3 | 3 | 1 | 1 | 3 | 3 | — |
| 8 | 3 | 0 | 3 | 3 | 3 | 3 | 0 | 1 | 3 | 3 | — |
| 9 | 3 | 2 | 3 | 3 | 3 | 3 | 0 | 2 | 3 | 3 | — |
| 10 | 0 | 0 | 3 | 2 | 2 | 2 | 0 | 1 | 1 | 2 | 0 |
| 11 | 0 | 0 | 3 | 3 | 0 | 3 | 3 | 1 | 0 | 2 | 3 |
| 12 | 0 | 0 | 3 | 3 | 3 | 3 | 0 | 3 | 3 | 3 | 3 |
| 13 | 3 | 0 | 3 | 3 | 3 | 3 | 0 | 3 | 3 | 3 | 3 |
| 14 | 3 | — | 3 | 3 | 3 | 3 | 3 | 2 | 3 | 3 | 0 |
| 15 | 3 | — | 3 | 3 | 3 | 3 | 0 | 2 | 3 | 3 | 0 |
| 16 | 3 | 2 | 3 | 3 | 3 | 3 | — | 3 | 3 | 3 | — |
| 17 | 3 | 3 | 3 | 3 | 3 | 3 | — | 0 | 3 | 3 | — |

N.B.—"—" means not tested.

Compositions according to the invention were made up in the following manner and tested in different ways against various foliarborne fungal diseases. The procedure adopted for each test is described below.

An aqueous solution or suspension containing 500 parts per million (p.p.m.) of the compound under test and suitable either for drenching the soil surrounding growing plants, or for spraying onto the leaves of cucumber, vine or apple plants is obtained by adding water to a solution of the compound (200 mg.) in acetone (1 ml.) until the total volume of the mixture is 400 ml. An aqueous solution or suspension suitable for spraying onto the leaves of wheat, barley or rice plants is prepared similarly, but instead of water, 0.1% volume/volume aqueous solution of the polyoxyethylenesorbitan monolaurate wetting agent, "Tween" 20, is used ("Tween" is a trademark).

(A) Spray-applied protectant test (P.S.A.)

A suspension or solution containing 500 p.p.m. of the active compound was sprayed directly onto the leaves of plants, a wetting agent being used when the plant was wheat, barley or rice. After 24 hours the plant was inoculated with the fungus under test and after a suitable period of time (time interval A—see table below) depending upon the particular plant and fungus, the extent of infection was assessed visually.

(B) Drench-applied protectant test (P.R.D.)

A suspension or solution containing 500 p.p.m. of the active compound was applied to the soil surrounding the plant under test, and 48 hours later the plant was inoculated with the fungus. The extent of infection was assessed visually after a period of time (time interval B—see table below) depending upon the plant and the fungus.

(C) Spray-applied eradicant test (E.S.A.)

The plants were inoculated with the fungus under test, and 24 hours later the liquid preparation containing 500 p.p.m. of the active compound was sprayed onto the leaves of the plants as described under A above. After a further period of time (time interval C—see table below), again depending upon the particular plant and fungus, the extent of infection was assessed visually.

| Disease and plant | Time interval (days) A and B | C |
|---|---|---|
| Puccinia recondita (wheat) | 10 | |
| Sphaerotheca fuliginea (cucumber) | 7 | 6 |
| Erysiphe graminis (wheat) | 7 | 6 |
| Erysiphe graminis (barley) | 7 | 6 |
| Podosphaera leucotricha (apple) | 10 | 9 |
| Plasmopara viticola (vine) | 7 | |
| Piricularia oryzae (rice) | 7 | 6 |
| Venturia inaequalis (apple) | 21 | 20 |

The results of the tests are set out in Table III below the amount of disease being expressed as a grading giving the percentage amount of disease:

| Grading: | Percentage amount of disease |
|---|---|
| 0 | 61 to 100 |
| 1 | 26 to 60 |
| 2 | 6 to 25 |
| 3 | 0 to 5 |

TABLE III

| Compound No. | Puccinia recondita (Rust) PSA | PRD | ESA | Sphaerotheca fuliginea (Powdery mildew) PSA | PRD | ESA | Erysiphe graminis (Powdery mildew) (W) PSA | PRD | ESA | Erysiphe graminis (Powdery mildew) (B) PSA | PRD | ESA | Podosphaera leucotricha (Powdery mildew) PSA | PRD | ESA | Plasmopara viticola (Downy mildew) PSA | PRD | ESA | Piricularia oryzae (Blast) PSA | PRD | ESA | Venturia inaequalis (Scab) PSA | PRD | ESA |
|---|---|---|---|---|---|---|---|---|---|---|---|---|---|---|---|---|---|---|---|---|---|---|---|---|
| 2 | 0 | 0 | | 0 | 0 | 2 | 3 | | 3 | 3 | 3 | 3 | 1 | | | | | | 1 | 1 | 0 | 0 | | |
| 3 | | | 1 | 1 | 0 | 0 | 3 | | | 3 | | | 2 | | | | | | 1 | 0 | 1 | | | |
| 4 | | | | 0 | | 1 | | | | | | | 2 | | | | | 0 | 2 | 1 | 0 | | | |
| 5 | | | | 1 | | 0 | | | | | | | | | | | | | 0 | 1 | | | | |
| 6 | | | | 0 | | 0 | | | | | | 0 | | | | | | | 1 | 0 | 0 | | | |
| 11 | | | | 1 | | 0 | | | | | 3 | 3 | | | 0 | 3 | | | | 0 | | | 0 | |
| 12 | | | | | | 0 | | | | | | | | | | | | | | | 0 | | | |
| 13 | | | | | | | | | | | | | | | | | | | | 0 | | | | 2 |

We claim:
1. A pyrimidine derivative selected from the group consisting of compounds of the formula:

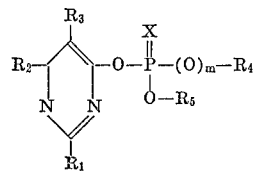

and the acid-addition salts thereof, wherein $R_1$ is amino, dimethylamino, diethylamino, formamido, ethoxycarbonylmethylthio, methylthio, ethylthio, or methyl; $R_2$ is hydrogen, methyl or chloro; $R_3$ is hydrogen, chloro or bromo; $R_4$ and $R_5$ are methyl or ethyl; X is sulphur or oxygen; and $m$ has the value zero or one; provided that at least one of $R_2$ and $R_3$ is a halogen atom.

2. A pyrimidine derivative according to claim 1 wherein $R_1$ is dimethylamino or diethylamino; $R_2$ is methyl; $R_3$ is chloro; $R_4$ and $R_5$ are methyl or ethyl; X is sulphur or oxygen; and $m$ has the value one.

3. A pyrimidine derivative according to claim 1 wherein $R_1$ is diethylamino; $R_2$ is methyl; $R_3$ is chloro; $R_4$ and $R_5$ are ethyl; X is sulphur and $m$ is one.

4. A pyrimidine derivative according to claim 1 wherein $R_1$ is dimethylamino, $R_2$ is chlorine, $R_3$ is hydrogen, $R_4$ and $R_5$ are ethyl, X is sulphur and $m$ is one.

References Cited
UNITED STATES PATENTS

| | | | |
|---|---|---|---|
| 3,287,453 | 11/1966 | McHattie | 260—256.5 |
| 3,378,565 | 4/1968 | Rigterink | 424—200 |
| 3,432,519 | 3/1969 | McTevier et al. | 424—200 |
| 3,467,655 | 9/1969 | Nakanishi et al. | 424—200 |
| 3,496,178 | 2/1970 | Scherer et al. | 424—200 |

ALEX MAZEL, Primary Examiner

R. J. GALLAGHER, Assistant Examiner

U.S. Cl. X.R.

260—251 P, 256.4 E; 424—200; 71—87